United States Patent [19]
Wilson

[11] 3,835,658
[45] Sept. 17, 1974

[54] FREEZE CRYSTALLIZATION OF SALINE WATER WITH A DIRECT CONTACT REFRIGERANT

[75] Inventor: John Henry Wilson, Stockport, England

[73] Assignee: United Kingdom Atomic Energy Authority, London, England

[22] Filed: Jan. 31, 1973

[21] Appl. No.: 328,368

[30] Foreign Application Priority Data
Feb. 11, 1972 Great Britain ..................... 6409/72

[52] U.S. Cl. ..................................... 62/58, 62/123
[51] Int. Cl. ............................................. B01d 9/04
[58] Field of Search ....................................... 62/58

[56] References Cited
UNITED STATES PATENTS

| | | | |
|---|---|---|---|
| 2,997,856 | 8/1961 | Pike | 62/58 |
| 3,477,241 | 11/1969 | Ashley | 62/58 |
| 3,478,531 | 11/1969 | Karnofsky | 62/58 |
| 3,486,848 | 12/1969 | Hendrix | 62/58 |
| 3,528,256 | 9/1970 | Karnofsky | 62/58 |
| 3,605,426 | 9/1971 | Chao et al. | 62/58 |
| 3,675,436 | 7/1972 | Ganiaris | 62/58 |
| 3,677,405 | 7/1972 | Keith | 62/58 |
| 3,714,791 | 2/1973 | Peck | 62/58 |
| 3,724,229 | 4/1973 | Seliber | 62/58 |
| 3,803,860 | 4/1974 | Nagashima et al. | 62/58 |

FOREIGN PATENTS OR APPLICATIONS

| | | | |
|---|---|---|---|
| 217,766 | 10/1958 | Australia | 62/58 |

Primary Examiner—Norman Yudkoff
Assistant Examiner—F. Sever
Attorney, Agent, or Firm—Larson, Taylor and Hinds

[57] ABSTRACT

A method and apparatus for the desalination of saline water by freezing in which a mixture of ice and concentrated saline water is formed by cooling the saline water by heat exchange with an evaporating liquid refrigerant, the ice is separated from the concentrated saline water and melted, and at least a portion of the evaporated refrigerant is reliquified by heat exchange with an aqueous solution which is itself cooled by heat exchange with liquid methane or liquid natural gas.

7 Claims, 1 Drawing Figure

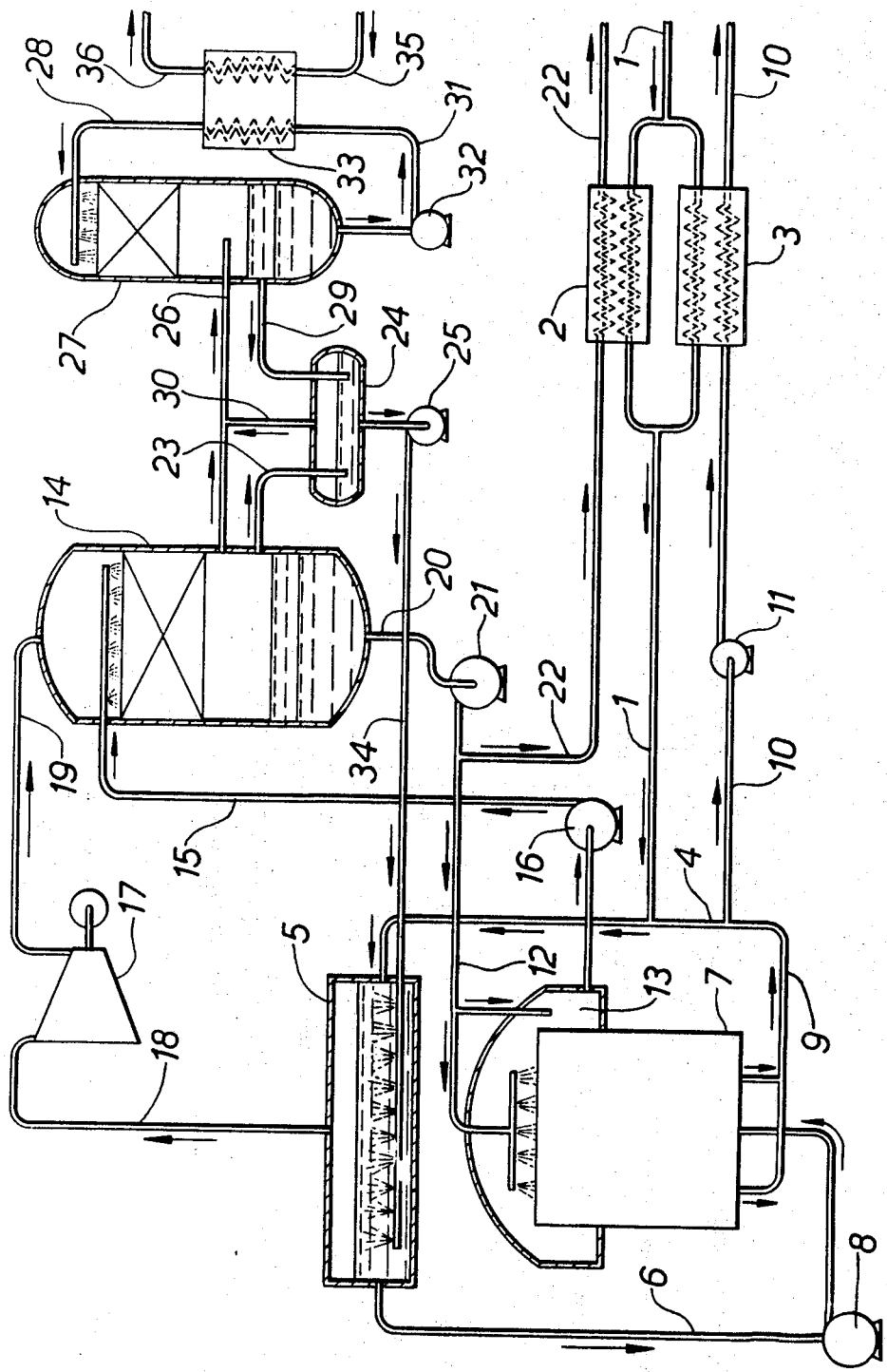

FREEZE CRYSTALLIZATION OF SALINE WATER WITH A DIRECT CONTACT REFRIGERANT

BACKGROUND OF THE INVENTION

This invention relates to a method and apparatus for the desalination of saline water, for example sea water or brackish water, by freezing.

A known method for the desalination of saline water by freezing comprises the steps of forming a mixture of ice and brine by cooling the saline water by heat exchange with an evaporating liquid refrigerant, separating the ice from the brine, melting the separated ice so as to obtain fresh water, and reliquifying the evaporated refrigerant. Considerable energy is expended in reliquifying the evaporated refrigerant.

Liquid methane or liquid natural gas is currently imported in bulk into many countries. The liquid gas must be regasified before being introduced into pipe lines for domestic or industrial use. During regasification large quantities of cold are liberated, and it is an object of this invention to utilise this ready source of cold in a process for the desalination of saline water.

SUMMARY OF THE INVENTION

Thus according to the present invention there is provided a method for the desalination of saline water by freezing, comprising the steps of forming a mixture of ice and concentrated saline water by cooling the saline water by heat exchange with an evaporating liquid refrigerant, separating the ice from the concentrated saline water, melting the separated ice so as to obtain fresh water, and reliquifying a portion of said evaporated refrigerant by heat exchange with an aqueous solution in a condenser, said aqueous solution being cooled by heat exchange with liquid methane or liquid natural gas.

Further according to the invention, there is provided apparatus for performing the method aforesaid, the apparatus comprising a crystalliser in which a mixture of ice and concentrated saline water is formed by cooling the saline water by heat exchange with an evaporating liquid refrigerant, a wash column in which the ice is separated from the concentrated saline water, a melter in which the separated ice is melted, a condenser for reliquifying a portion of the evaporated refrigerant by heat exchange with an aqueous solution and a heat exchanger for cooling the aqueous solution with liquid methane or liquid natural gas.

DESCRIPTION OF THE DRAWING

The invention will become further apparent from the following description with reference to the accompanying drawing which illustrates schematically, by way of example only, one form of apparatus for performing a method embodying the invention.

DESCRIPTION OF A PREFERRED EMBODIMENT

Saline water is supplied to the apparatus through a conduit 1 to two heat exchangers 2 and 3 in which it is cooled by heat exchange with out-going fluid streams.

The pre-cooled saline water is mixed with colder and more saline brine in a conduit 4, before passing onwardly to a crystalliser 5. Liquid refrigerant, in this case n-butane, is injected into the crystalliser 5 and evaporates within the brine, thus exchanging heat by direct contact and producing ice crystals, as well as further concentrating the brine.

The resultant slurry of ice and concentrated brine is passed through a conduit 6 to a wash column 7 via a pump 8. In the wash column 7 the ice separates from the brine; the separated brine leaves the column 7 through conduit 9 and a portion of the brine becomes the reject stream which is extracted through a conduit 10 via a pump 11 and heat exchanger 3.

Fresh water, made in the process, as will be described, is delivered to the top of the wash column 7 through conduit 12 and is used to wash the separated ice and also to reslurry the ice in a trough 13 surrounding the upper region of the wash column.

The ice and fresh water slurry is then pumped to a melter vessel 14 via a conduit 15 and pump 16.

Refrigerant vapour from the crystalliser 5 passes to a gas compressor 17 through a conduit 18 and then to the upper region of the melter vessel 14 through a conduit 19. In the vessel 14 compressed refrigerant vapour contacts the relatively cold ice and water slurry and condenses, thus giving up heat which causes the ice to melt. The resultant mixture of water and liquified refrigerant settles on the bottom of the vessel 14 where it separates out into two discrete layers. The liquified refrigerant, being less dense than water, forms the upper layer and the water forms the lower layer.

The fresh water is extracted through a conduit 20 by a pump 21 and is separated into two streams, one of which passes along conduit 12 to the wash column 7, whilst the other leaves the process as product water along conduit 22 via heat exchanger 2. The liquified refrigerant forming the upper layer in the melter 14 is drawn off via a conduit 23 and deposited into a collecting tank 24 from which it is fed to the crystalliser 5 via a conduit 34 and a pump 25.

Owing to the limited cooling capacity of the ice and water slurry in the melter 14, some of the evaporated refrigerant is not condensed therein and this portion is passed to a condenser 27 via a conduit 26. In the condenser 27 the refrigerant is contacted with a low temperature aqueous fluid which is fed to the upper region of the condenser 27 via a conduit 28. Thus the refrigerant condenses and the heat given up by the refrigerant is taken up by the aqueous fluid whose temperature therefore rises. In the lower portion of the condenser 27 the liquified refrigerant and the aqueous solution separate out into two layers the upper of which is constituted by liquified refrigerant which is drawn off via a conduit 29 into the collecting tank 24. The latter is provided with a gas vent 30 which returns any flash vapour to conduit 26 for recondensing in vessel 27.

The aqueous fluid leaving the condenser 27 passes through conduit 31, via pump 32, to a heat exchanger 33, the output of which is connected to conduit 28.

In the heat exchanger 33 the aqueous fluid is cooled by heat exchange with liquid natural gas to a very low temperature and is then returned to the condenser 27 via conduit 28. The natural gas enters and leaves the heat exchanger 33 via conduits 35 and 36 respectively, and its temperature is thereby raised.

The aqueous fluid circulating between condenser 27 and the heat exchanger 33 is preferably a concentrated solution of salts, typically sodium chloride or calcium chloride hexahydrate, or a mixture of both. Alternatively concentrated sea water or aqueous organic solutions may be used. With these concentrated aqueous solutions it is possible to reduce the temperature of the aqueous fluid to a very low value whilst avoiding the formation of ice deposits which would otherwise cause difficulty in the operation of the heat exchanger 33. The refrigerant is condensed in vessel 27 at a temperature only slightly above the freezing point of pure water and it is of benefit to ensure that the temperature of the aqueous fluid entering the condenser in conduit 28 is as low as possible to minimise the quantity of fluid being pumped.

The aqueous circuit between the condenser 27 and the natural gas heat exchanger 33 is required because of the presence of water vapour which accompanies the refrigerant gas entering the condenser. If this water vapour were to contact surfaces cooled directly by liquid natural gas a considerable amount of ice would form and accumulate so as completely to block the condenser in a very short time, thus rendering the latter ineffective. By using the intermediate aqueous circuit the water vapour merely condenses and slightly dilutes the aqueous solution. The concentration of the latter can be maintained constant by circulating a fraction of the aqueous fluid through a subsidiary circuit in which the solution is filtered and some of the water content is removed by evaporation.

It should be noted that the condenser 27 and melter 14 operate at substantially the same pressure so that only one pressure is to be controlled. This results in a substantial saving in equipment and cost.

I claim:

1. A method for the desalination of saline water by freezing, comprising the steps of forming a mixture of ice and concentrated saline water by cooling the saline water by heat exchange with an evaporating liquid refrigerant, separating the ice from the concentrated saline water, melting the separated ice so as to obtain fresh water, and reliquefying a portion of said evaporated refrigerant by heat exchange with an aqueous solution in a condenser, said aqueous solution having a low freezing point and being cooled by heat exchange with liquid methane or liquid natural gas.

2. A method as claimed in claim 1 wherein the aqueous solution comprises sodium chloride.

3. A method as claimed in claim 1 wherein the aqueous solution comprises calcium chloride hexahydrate.

4. A method as claimed in claim 1 wherein the aqueous solution comprises an aqueous organic solution.

5. Apparatus for the desalination of saline water by freezing, the apparatus comprising a crystalliser in which a mixture of ice and concentrated saline water is formed by cooling the saline water by heat exchange with an evaporating liquid refrigerant, a wash column in which the ice is separated from the concentrated saline water, a melter in which the separated ice is melted, a condenser for reliquefying a portion of the evaporated refrigerant by heat exchange with an aqueous solution, and a heat exchanger for cooling the aqueous solution with liquid methane or liquid natural gas.

6. A method according to claim 1 wherein the separated ice is melted by contact with vapors of said liquid refrigerant evaporated while cooling said saline water, a portion of said vapors being condensed to a liquid during melting of said ice, and wherein the remaining, uncondensed, portion of said vapors is reliquefied by heat exchange with said aqueous solution.

7. Apparatus according to claim 5 including means for conveying evaporated vapors of said liquid refrigerant to said melter for melting said separated ice by contact between said ice and said vapors whereby a portion of said vapors condenses, and means for conveying the remaining, uncondensed, portion of said vapors from said melter to said condenser for reliquefying same by heat exchange with said aqueous solution.

* * * * *